Jan. 1, 1957 J. A. RAJCHMAN ET AL 2,776,419

MAGNETIC MEMORY SYSTEM

Filed May 8, 1953 8 Sheets-Sheet 1

INVENTORS
JAN A. RAJCHMAN
& MILTON ROSENBERG

BY Samuel Lindenberg
ATTORNEY

INVENTORS
JAN A. RAJCHMAN
& MILTON ROSENBERG
BY Samuel Lindenberg
ATTORNEY

INVENTORS
JAN A. RAJCHMAN
& MILTON ROSENBERG

BY Samuel Lindenberg
ATTORNEY

INVENTORS
JAN A. RAJCHMAN
& MILTON ROSENBERG

BY Samuel Lindenberg
ATTORNEY

INVENTORS
JAN A. RAJCHMAN &
MILTON ROSENBERG

BY Samuel Lindenberg
ATTORNEY

INVENTORS
JAN A. RAJCHMAN &
MILTON ROSENBERG

BY Samuel Lindenberg
ATTORNEY

INVENTORS
JAN A. RAJCHMAN &
MILTON ROSENBERG
BY Samuel Lindenberg
ATTORNEY

Jan. 1, 1957 J. A. RAJCHMAN ET AL 2,776,419

MAGNETIC MEMORY SYSTEM

Filed May 8, 1953 8 Sheets-Sheet 8

INVENTORS
JAN A. RAJCHMAN & MILTON ROSENBERG

BY Samuel Lindenberg
ATTORNEY 2,776,419

MAGNETIC MEMORY SYSTEM

Jan A. Rajchman, Princeton, and Milton Rosenberg, Trenton, N. J., assignors to Radio Corporation of America, a corporation of Delaware Application May 8, 1953, Serial No. 353,817

14 Claims. (Cl. 340—174)

Figure 1:
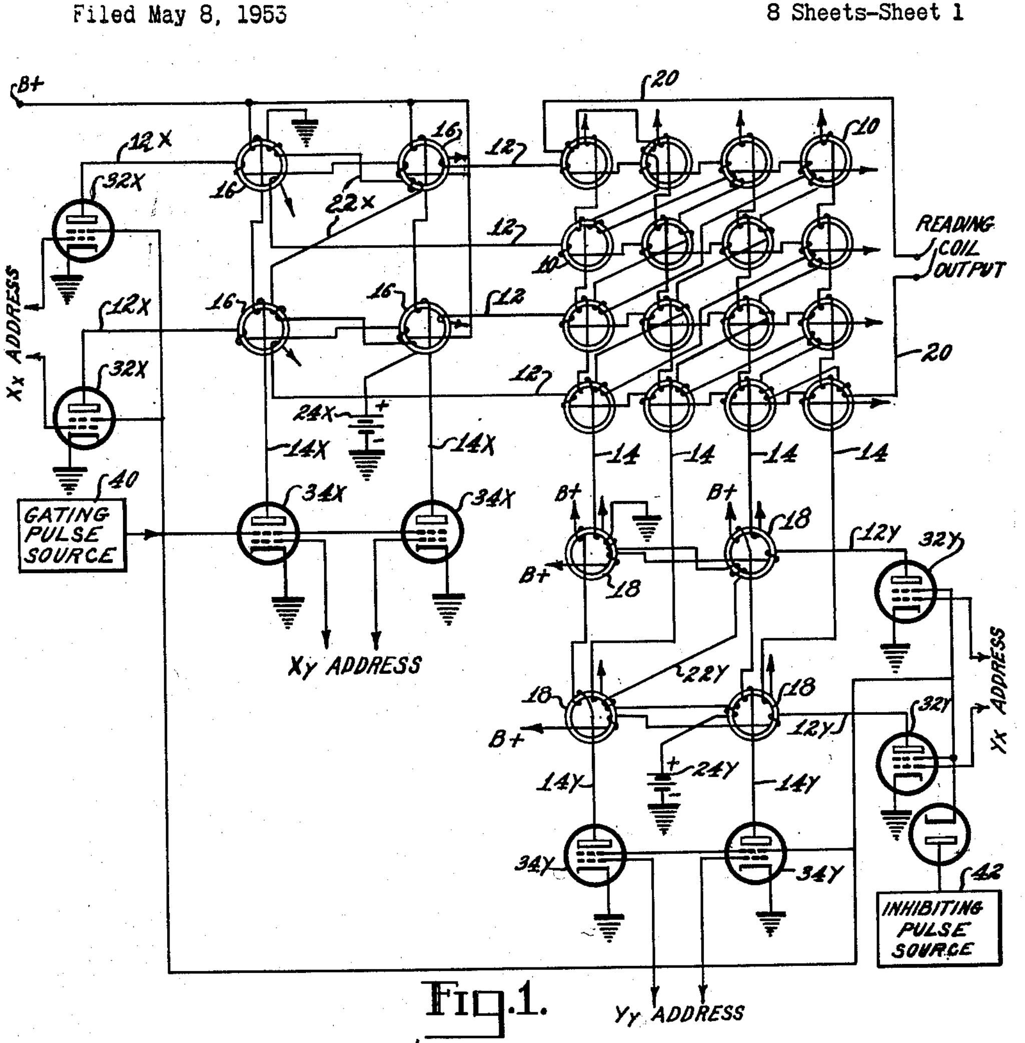

This invention relates to magnetic matrix memories of the type which are employed with computers. More specifically, this invention is an improvement in the system for and method of operating such magnetic memory matrices.

A random access static magnetic memory of the type intended has been described in an article by Jay W. Forrester, in the Journal of Applied Physics, January 1951, page 44, entitled "Digital Information Storage in Three Dimensions Using Magnetic Cores." A further description may be found in an article by Jan A. Rajchman in the RCA Review for June 1952, entitled "Static Magnetic Matrix Memory and Switching Circuits."

A memory system of the type intended includes a number of magnetic cores which are arranged in columns and rows. The cores are saturated magnetically in one polarity to represent a "1" in a binary system and in the opposite polarity to represent a "0" in the binary system. In order to place the cores in the desired polarity and also to determine what such polarity is, the columns and rows of the cores are provided with a number of coils. Each row of cores is inductively coupled to a separate row coil, and each column of coils is inductively coupled to a separate column coil. It will be appreciated that each core is coupled to a single row coil and a single column coil. In order to drive a core to saturation in a desired polarity, current is applied to the two coils coupled thereto. The sum of the currents applied to the selected row coil and to the selected column coil is made sufficient to provide the required saturating magnetomotive driving force. However, the excitation applied to a row coil or a column coil alone is insufficient to seriously disturb any one of the cores from the condition of remanence in which they were placed by previous operations.

For the purpose of reading, the cores are always driven in one direction, let us say, to polarity P. If a core is already in such polarity P, no output is induced in a reading coil to which all the cores in the matrix are coupled. If the core is in the opposite polarity, or polarity N, driving it to P will cause a large flux change to occur. Thus a voltage is induced in the reading coil and an output appears indicative of the condition of the core. Of course, apparatus is required to restore such a core to condition N, since, in the process of reading, the information stored in the core has been destroyed.

As pointed out, the reading coil is inductively coupled to all the cores in the matrix. In the process of reading a core, usually half excitation is applied to the row coil and the other half required excitation is applied to the column coil coupled to the core from which information is sought. This half excitation will cause each of the cores in the excited column and row, which are not selected, to make a minor hysteresis excursion. The magnetic characteristics of present day materials is such that there is some flux change in the saturated regions responsive to the half excitation. Accordingly, these minor hysteresis excursions do induce voltage in the reading coil.

With a large magnetic matrix, these voltages from the non-selected cores on an excited row and column can cause a sufficiently large voltage to be induced in the reading coil so that, the presence or absence of a voltage as a result of the double excitation applied to the core desired to be read is not distinguishable. In such case, the condition of any particular core cannot be determined.

In order to reduce considerably the undesired signals from the non-selected cores, one expedient used is to couple the reading coil to the cores in such a fashion that these undesired signals oppose each other to a marked degree, and thus the presence or absence of a signal from the core desired to be read is distinguishable at the output terminals of the reading coil. In order to effectuate this, the reading coil is coupled to the cores of the magnetic matrix in a manner so that the sense of the reading coil winding upon adjacent cores is always opposite. This is called the "checkerboard" winding system and is described and claimed in an application by Jan A. Rajchman, filed March 8, 1952, Serial No. 275,621, for "Magnetic Information Handling System," now Patent No. 2,691,154, dated Oct. 5, 1954. As a practical matter, the undesired signal is considerably reduced, but is not completely eliminated. With smaller matrices, the system is fairly successful, but as the magnetic matrices are sought to be increased in size, the degree of success diminishes and other troubles are added.

In an application, Serial No. 344,735, filed March 26, 1953, for "Memory System," by R. Stuart-Williams and assigned to the same assignee as the present application, there is described in detail the additional difficulties present which tend to prevent an unequivocal determination of the condition of a core in a magnetic matrix. In essence, it is shown that the voltages which are induced as a result of the magnetomotive forces applied to the non-selected cores are not coexistent in time, neither do they all have the same amplitude. Accordingly, their cancellation within the matrix by reason of the checkerboard winding system is not a complete one. There is still a voltage provided in the output of the reading winding which can effectively mask the voltage from the desired core being driven.

Stuart-Williams shows a system for considerably reducing this difficulty by integrating the output signal in a reading winding. If the cores are selected so that there is a substantial uniformity in the flux change due to the application of a magnetomotive force, despite amplitude and time phase differences between the cores, with the total flux change being the same, integration of the resultant voltage in the output of the reading coil over a sufficiently long period so that the signals from the cores have completely subsided, followed by amplitude discrimination, will provide an accurate identification of the signal from the desired core.

Although this integration system, plus the checkerboard winding, has advanced the ability to discriminate against unwanted signals in a magnetic matrix memory, there are still some further limitations which can prevent construction of a large size memory system. It will be appreciated that this is so, since the ultimate possible storage capacity of the memory depends upon the ratio of wanted to unwanted signals. While the wanted signal (that from a single core) remains constant, the unwanted signal still increases with the size of the memory.

The cancellation of unwanted signals from the above described systems is still not perfect for two reasons. First, the properties of the cores, despite most careful selection, are still likely to vary slightly from core to core. Consequently, the cancellation of signals from the non-selected cores with randomly distributed properties will deteriorate proportionally to a dispersion coefficient K and to the square root of the number of the cores which is equal to $\sqrt{2n}$ for a matrix having $n \times n$ cores. This difference in properties may be attributed to the fact that the flux change of each core is not exactly the same in response to the same driving magnetomotive force in every instance. The second cause for the unwanted signal cancellation not being perfect arises from the fact that the change of magnetic induction, due to the partial magnetization in a given direction, is different for the two magnetic states of any core. The characteristic of a core near remanence is curved. Accordingly, a greater change of induction or flux will occur for a positive partial magnetization when a core is in the negative remanent state than when the core is in the positive remanent state. Consequently, the signals from unselected cores at different storing polarities will not cancel perfectly and the unwanted signal from the reading coil will depend for its amplitude upon the pattern of stored polarities of magnetization. The unwanted signal due to this action will be greatest when all cores which are linked by a given sense winding of the reading coil are at the same state of remanence and all the other cores which are linked with the opposite sense of winding are in the opposite state of remanence. Although the differences for each core between the induced voltages provided when it is partially driven at the P or at the N state may be a very small quantity, the total signal from this difference may become objectionably large for large matrices. The factor determining this difference depends on the magnetic materials and is surprisingly large even for materials which have a very "rectangular hysteresis" loop.

It is an object of the present invention to provide a method of operation for a magnetic memory and a system which cancels the unwanted signal arising from the lack of uniformity of the properties of cores.

It is a further object of this invention to provide a system and a method of operation for a magnetic matrix memory which permits increasing the size of magnetic matrix memories beyond those heretofore possible.

Still another object of the present invention is to provide a system and a method of operation of a magnetic matrix memory which is novel and unique.

These and further objects of the invention are provided by integrating and readting signal obtained from a magnetic matrix memory over one and preferably two cycles of operation in each cycle of which the magnetic cores on the excited row coil and the excited column coil are subject to equal and opposite magnetizing forces. Thereby all non-selected cores describe minor closed hysteresis loops with no net change of fluix, i. e., no net contribution to the integrated signal. The selected core either describes a major symmetrical loop, with no net contribution to the integrated signal or else it suffers a drastic change from one remanent state of magnetization to the other with a corresponding large contribution to the integrated signal.

Figure 2:
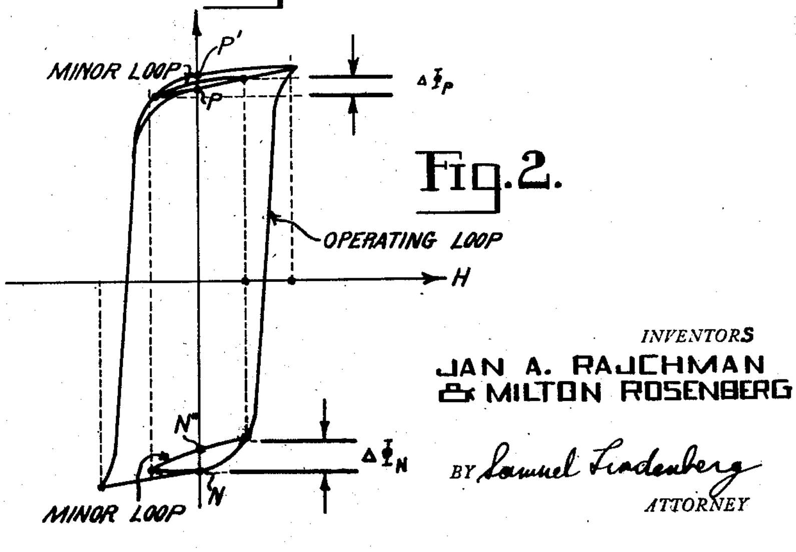
Figure 3A:
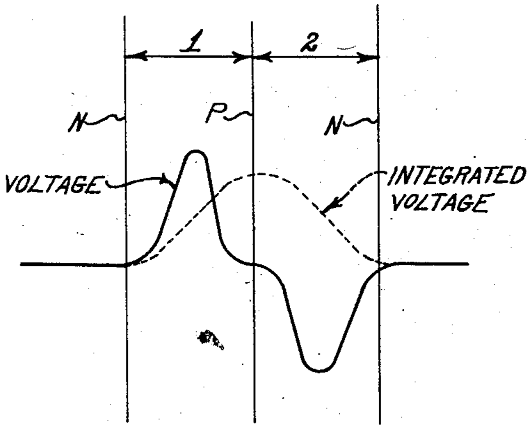
Figure 3B:
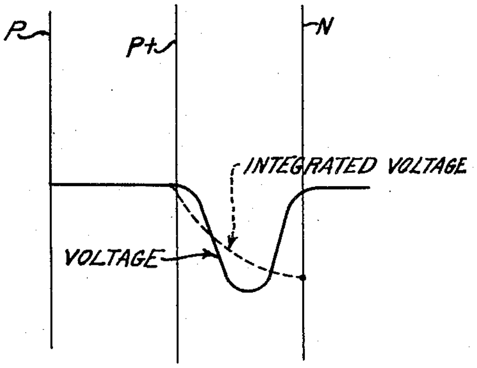
Figure 4A:
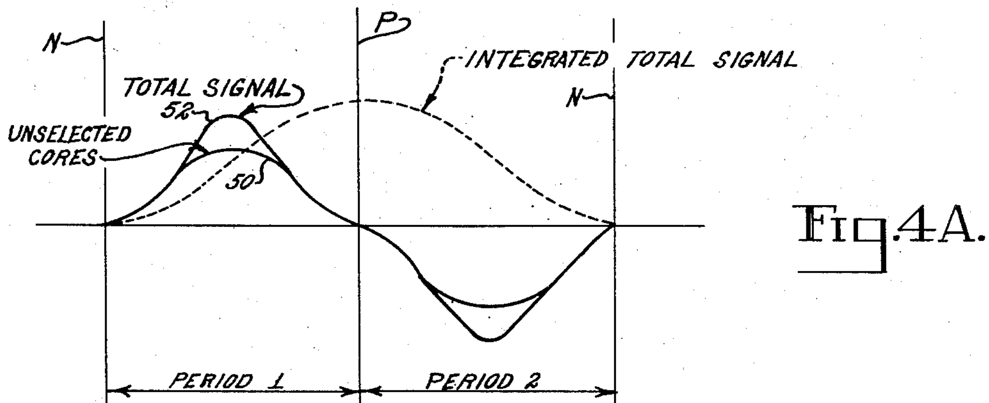
Figure 4B:
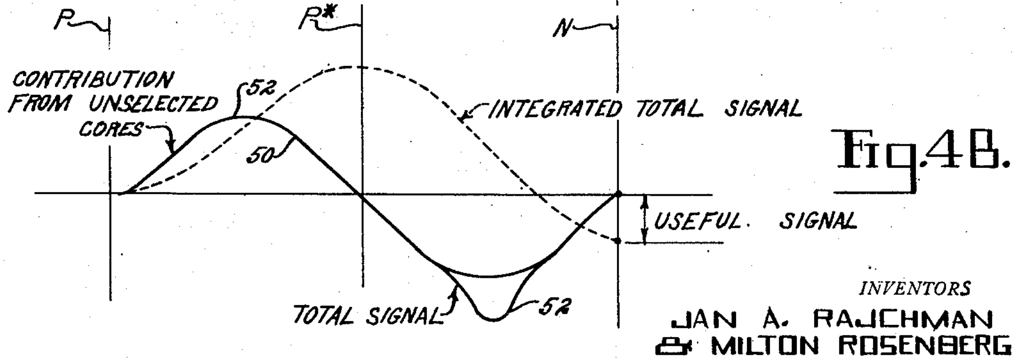
Figure 5:
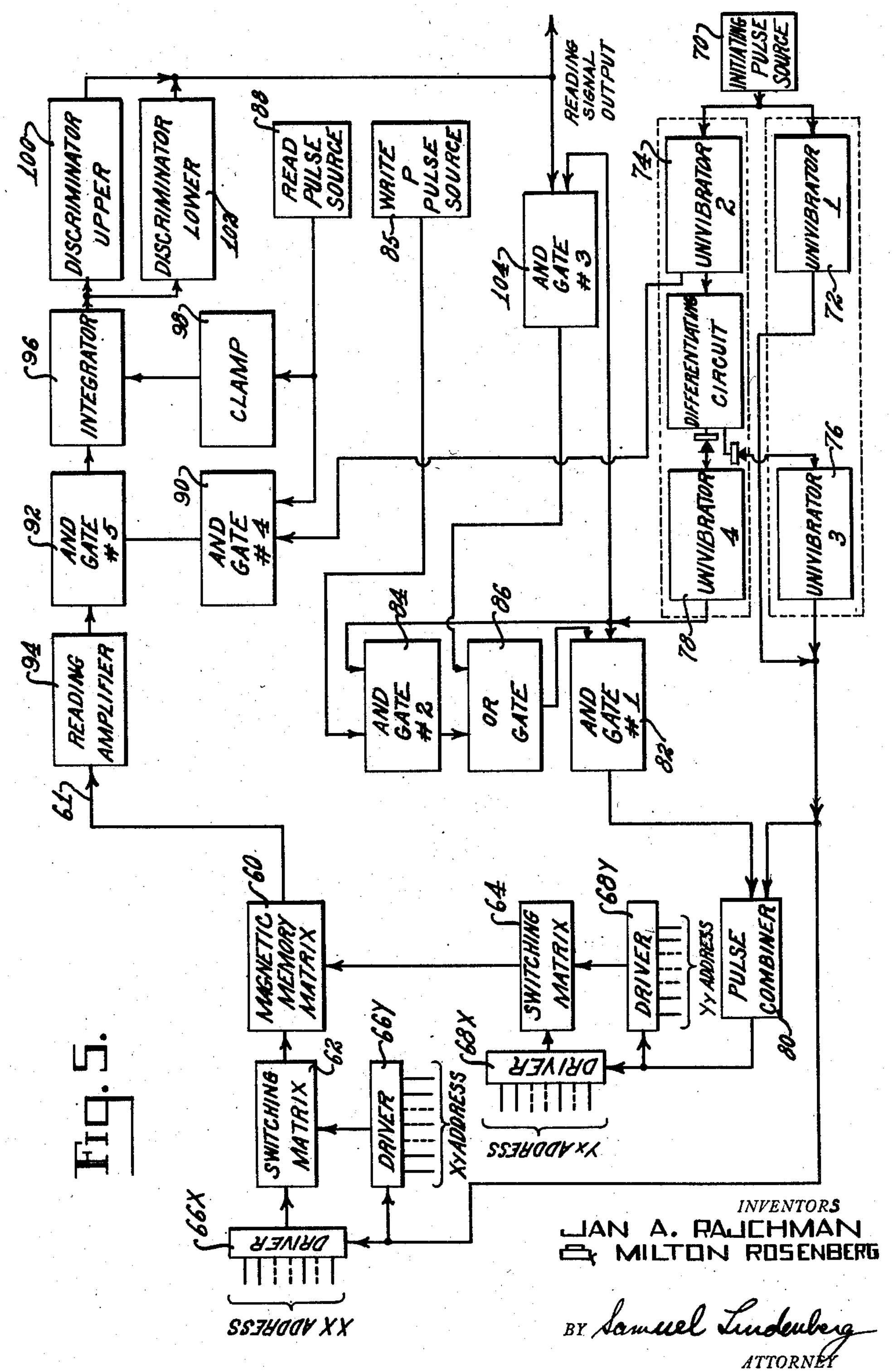
Figure 6:
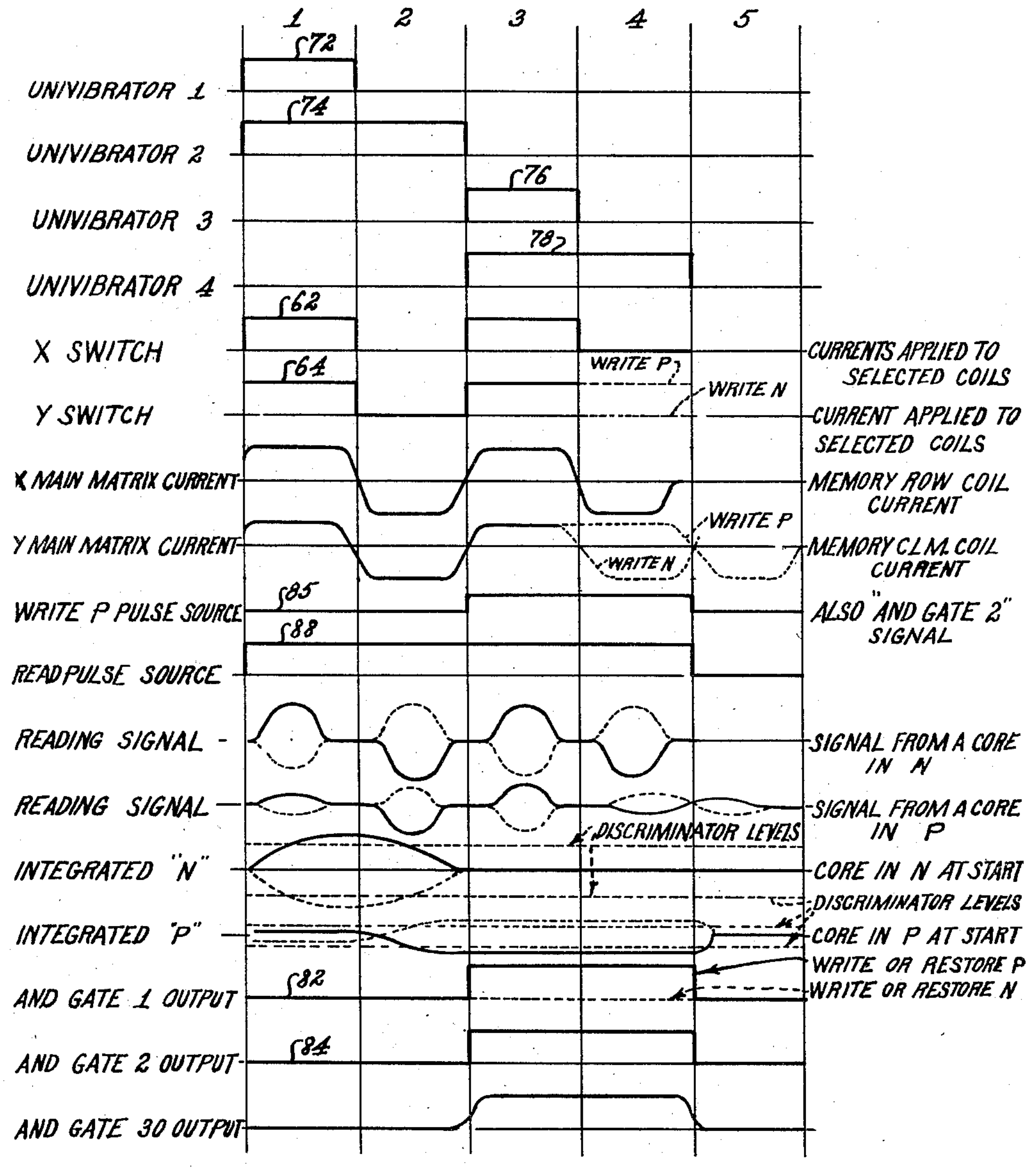
Figure 7:
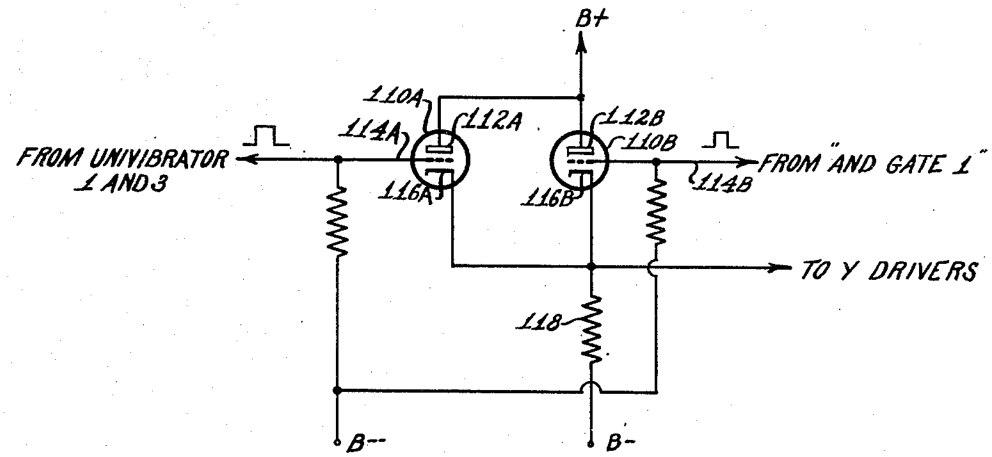
Figure 8:
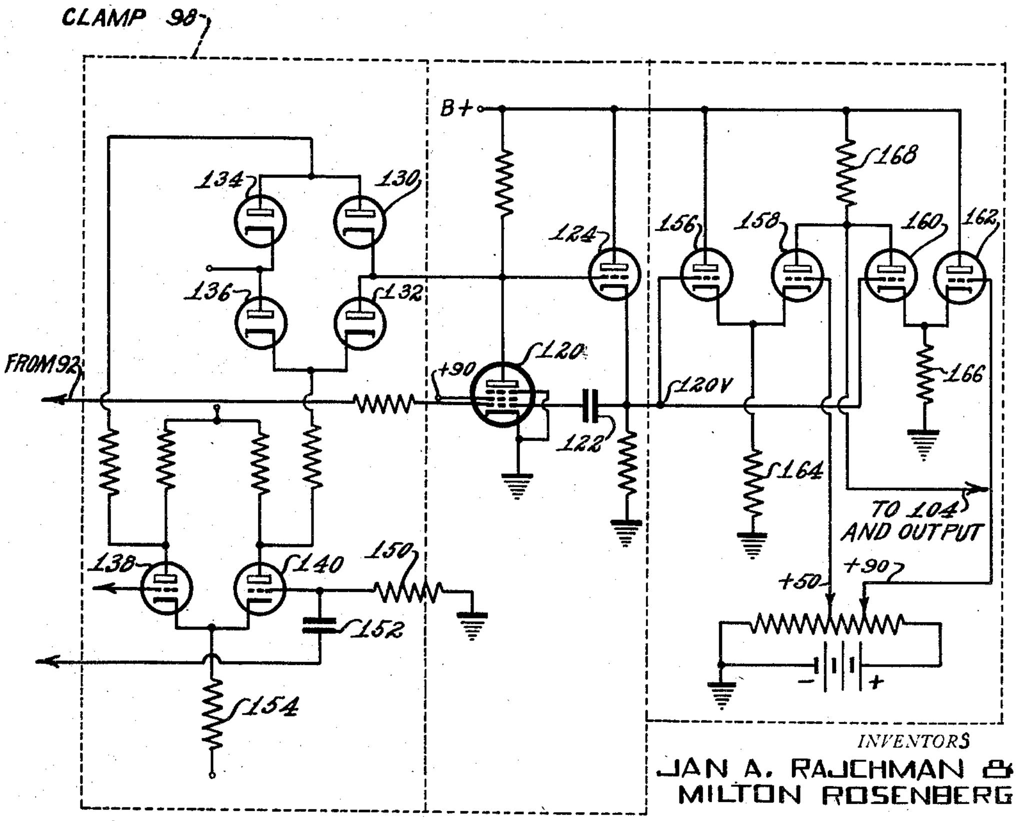
Figure 9:
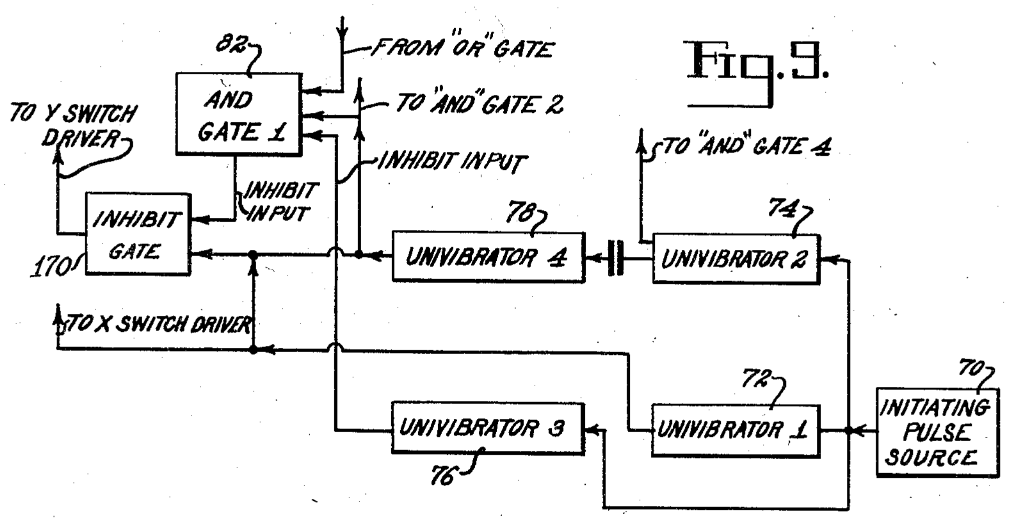
Figure 10:
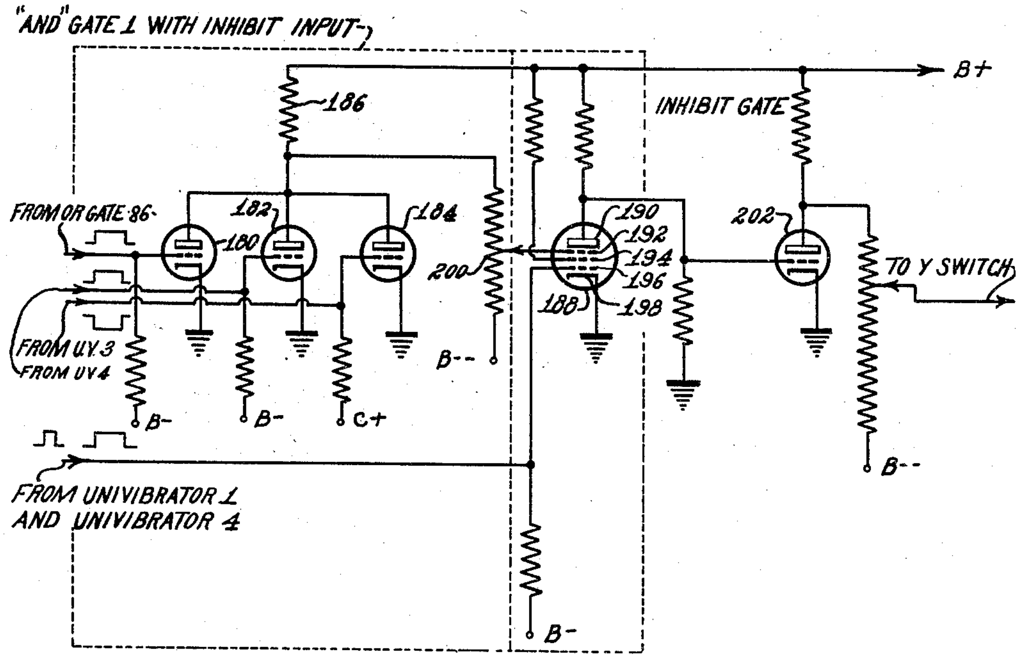
Figure 11:
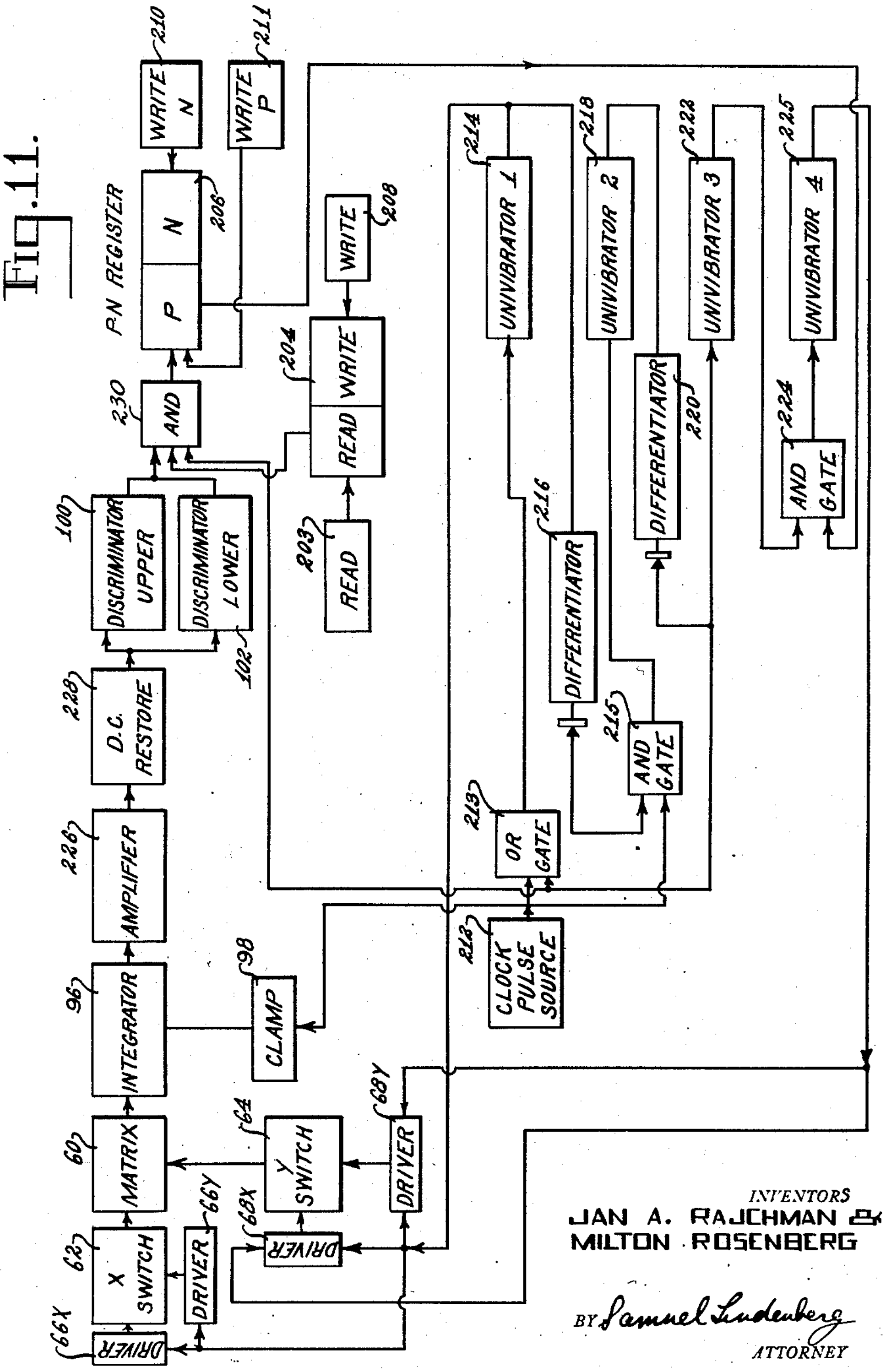
Figure 12:
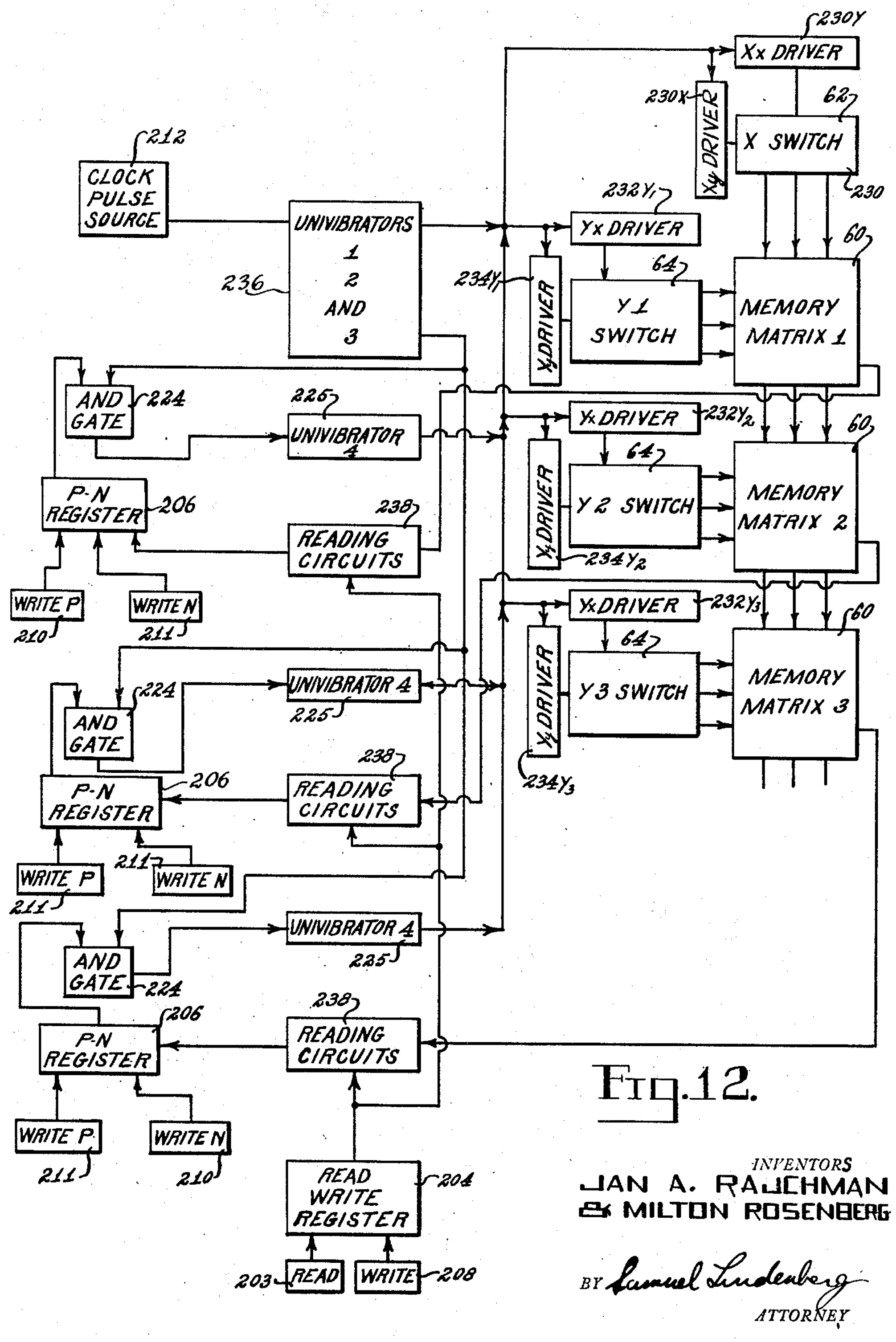

The novel features of the invention, as well as the invention itself, both as to its organization and method of operation will best be understood from the following description when read in connection with the accompanying drawings, in which Figure 1 is a schematic diagram of an illustrative magnetic matrix memory which is driven by two magnetic switches, Figure 2 is a hysteresis curve shown for the purpose of assisting in the explanation, Figures 3*a* and 3*b* are curves of voltage vs. flux change and their integrals, illustrative of the wave shapes provided by a single core in a magnetic matrix which is driven from one remanence state to the opposite state, Figures 4*a* and 4*b* are wave shapes of the voltage changes derived at the output of a reading winding when a magnetic core is read, and the integrals of these voltages, Figure 5 is a schematic diagram of a magnetic matrix system which may be operated in accordance with the method described herein, Figure 6 illustrates various wave shapes which are obtained in the operation of this system, Figure 7 is a schematic diagram of a "pulse combiner" circuit used in an embodiment of the invention, Figure 8 is a circuit diagram of an integration and discrimination system used in an embodiment of the invention, Figure 9 is a schematic diagram of apparatus embodying the invention, Figure 10 is a circuit diagram of an "and gate" which may be employed in an embodiment of the invention, and Figures 11 and 12 are schematic diagrams of apparatus illustrating other embodiments of the invention.

Referring now to Figure 1, there may be seen a magnetic matrix memory of the type intended which is shown as being driven by two magnetic switches. This memory system is exemplary only and is not to be construed as a limitation upon the size of the system or upon the orientation of the cores shown employed. The magnetic memory includes a plurality of magnetic cores 10 arranged in columns and rows. Each row of cores is coupled to a different row coil 12. Each column of cores is coupled to a different column coil 14. The row coils 12 in turn are each coupled to a different core 16 in the row driving switch. The column coils 14 are each coupled to a different core 18 in the column driving switch. In the magnetic matrix memory there is also a reading coil 20 which is inductively coupled to each one of the cores 10 by windings. The sense of the windings of the reading coil on each core is made opposite, so that any two adjacent cores do not have the same reading winding sense.

The magnetic switches are of the type described in an application of Jan. A. Rajchman, Serial No. 337,902, filed February 20, 1953, for "Magnetic Switching Devices," and assigned to this assignee. The two switches employed herein are alike, so that a description of only one will suffice.

The construction of the switches is quite similar to that of the magnetic memory. The magnetic cores 16, or 18 of a switch are arranged, for convenience, in columns and rows. Each core has thereon an output winding. The output windings of one switch, hereafter termed the *x* switch, serve to drive the respective row coils of the memory. Each row of cores in a switch is inductively coupled to a separate row coil **12*x* or 12*y*; each column of cores in a switch is inductively coupled to a column coil 14*x* or 14*y*. A biasing coil 22*x* or 22*y* is coupled to all the cores in the switch. It is usually excited from a source 24*x* or 24*y*, which provides current to maintain the switch cores biased in the N saturation region. Each switch row coil 12*x*, 12*y* and each switch column coil 14*x*, 14*y* is connected as a plate load for a separate driver tube 32*x*, 34*x* or 32*y*, 34*y***. These driver tubes permit the addressing or selection for driving to P of a particular core in a switch.

The driver tubes **32*x*, 34*x*, 34*y* are exemplary of a selective switching system. They are maintained non-conducting in the standby condition. Selection of a switch core in eatch switch to be driven to P is made by applying a positive signal to the first control grid of one tube 32*y*** in the *x* switch and one tube **32*y*** in the *y* switch which drives a row coil in the respective switches coupled to the selected switch cores and by applying a positive signal to the first control grid of one tube **34*x*** in the *x* switch and one tube **34*y*** in the *y* switch which drives the column coils in the respective switches coupled to the selected cores. These tubes do not become conductive, but are merely primed by the positive address signal. A gating signal from a source 40 is applied to the second control grids, to permit the addressed row and column coil driver tubes to become conductive.

The currents through the two excited coils in each switch apply a sufficient combined magnetomotive force to overcome the effect of the biasing coils and to drive the two selected switch cores to P. This induces a voltage in the output coils of the selected switch cores. When a core in the $x$ switch and a core in the $y$ switch are simultaneously driven to P, the voltages induced in their output coils are sufficient to cause to be driven to P the memory core 10 coupled to both the row and column coils 12, 14 driven by these output coils. When the driver tubes are made to cease conduction the switch cores, which were driven to P, are restored to N by operation of the biasing coils 22x, 22y. When the cores in the $x$ and $y$ switches, which were driven to P, are allowed to return to N together, by simultaneously terminating the conduction of the addressed row and column driver tubes, voltages are induced in the output coils of these cores which are sufficient to return to saturation at N, the memory core which these switch cores drove to P. If it is desired to leave this memory core in P, the switch cores are permitted to be restored to N in sequence and not simultaneously. This sequential restoration of the switch cores may be obtained in any number of ways. One of these is to provide an inhibiting pulse, from a source 42, to the second control grids of the $y$ switch drivers, while the $x$ switch drivers are still conducting. This type of operation may be found described in detail in the aforesaid application Serial No. 337,902.

Furthermore, a system for completely operating a magnetic matrix using magnetic switches of the type described above may be found completely described and claimed in application Serial No. 346,162, filed April 1, 1953, by Milton Rosenberg and Raymond Stuart-Williams, for "Memory System," and assigned to this assignee.

It should thus be apparent that by means of the system of Fig. 1, a magnetic memory can have information in binary coded form stored therein by operating the switches which drive the memory. For the purpose of reading the condition of a core in the memory, the switches are addressed and then simultaneously driven. The selected core receives a magnetomotive force to drive it to condition P. If a voltage is induced in the reading coil 20, it is known that the core was in condition N at the time of receiving its drive. Accordingly, the switches are permitted to simultaneously return to their starting condition (by the simultaneous termination of the selecting coil excitations). If no voltage is induced in the reading coil, then the switches are permitted to return to their starting condition in sequence (by terminating the switch coil excitations sequentially). Thus the selected core remains in the condition P.

Reference is now made to Figure 2, which shows a typical hysteresis curve characteristic for the presently available core materials. Non-selected cores which are in condition P and which receive half excitation as a consequence of being in the row or column which is excited, are driven along a minor loop as may be seen at the top of the hysteresis characteristic. In other words, selected row and column coils are excited with a P going force, the non-selected cores, which are in condition P, are driven further into the saturated P regions. Then when N going magnetomotive forces are provided, as the magnetic switches are allowed to return to their starting conditions, the non-selected cores in the P condition return back along the loop substantially to the position from which they first started. There may be some slight change in the magnetic condition, the minor loop not completely closing, so that the cores are left at a slightly lower saturation condition P instead of at P′ where they were initially transiently set. The total change in the flux will be shown as $\Delta\varphi_P$.

Regarding the area of the characteristic curve in the N saturation region, a core, which is positioned in condition N, in response to a P going half excitation is driven slightly into a less saturated region and then is returned to point N″ and then to point N after it receives the N going half excitation upon restoration of the magnetic switches. The difference in the flux generated respectively in each of the two cases is shown as $\Delta\varphi_P$ in the P region and $\Delta\varphi_N$ in the N region, and the difference between the flux changes at the P region and the N region may be represented as $\epsilon$ (not shown).

It will be seen that this difference does exist and is indicative of the fact that a perfect cancellation of the unwanted signals received in the checkerboard reading winding cannot occur unless the non-selected cores are all in P or all in N condition. In a large magnetic matrix memory, this signal $\epsilon$ may assume such proportions (dependent, of course, upon the magnetic peculiarities of the non-selected cores) as to mask any signal which is provided by the selected core. It should be noted that the minor hysteresis loops in the positive and negative saturation regions may either close or almost close depending on the material. If a magnetic core is at all capable of storage, i. e., of withstanding many cycles of partial demagnetizations and remagnetizations, to which any core in a matrix may be subjected, the deviation from a closed loop must be extremely small, otherwise the core is successively demagnetized as a result of being a non-selected core a number of times, and therefore cannot be used for storage.

A reading signal, which is obtained by the simultaneous excitation of a row coil and a column coil which are connected to a desired element in the matrix, may be considered as being made up of three parts. The first part is the contribution to the reading signal from non-selected cores, which is obtained by exciting the selected row coil. The second part is the contribution from non-selected cores, which occurs as a result of the excitation of the column coil. The third portion of the signal is the contribution to the reading signal provided by the selected core. It is feasible to separately excite a row coil and a column coil in two time periods, previous to reading, and then to integrate the signal contributions caused by these excited coils, which are detected in the reading coil. The integrated signal which results is now essentially a measure of the unwanted signal which occurs during the reading period. Consequently, if this signal is stored and then subtracted from the total signal obtained during the reading period proper, when both column and row coils are simultaneously excited, the resulting signal will be essentially that obtained from the selected core. The contributions of the unselected cores will be cancelled out and so will, to some extent, the unwanted contribution of the selected core itself, due to magnetization in the direction of its own remanence. This greatly increases the ratio of wanted to unwanted signals. While the above procedure is feasible, it is simpler to achieve the same result by the following scheduling.

Let the selected memory matrix row and column coils be excited simultaneously in a given direction, let us say P, in a first period of time. Let them be excited simultaneously again in the opposite direction, N, in a second period of time thus to complete a first cycle of operation. Consider the total integrated voltage reading signal at the end of the second period obtained by integrating the output of the reading coil. It can be considered as made up of the individual changes of magnetic flux of all non-selected cores on the selected lines and from the change of flux of the selected core, since integration of the reading coil voltage output is actually the measurement of flux change. Over the total excitation period, the change of flux of the unselected cores is that resulting from the excursion along a minor unsymmetrical hysteresis loop, as is shown and explained in Fig. 2. This loop closes or almost closes on itself if the core is at all capable of storage. Consequently, the contributions to the final integrated voltage signal due to the unselected cores will be vanishingly small, to the degree to which the first minor unsymmetrical loop closes upon itself. The contribution of the selected core to the integrated voltage reading signal will be zero if the core was originally at N, because the operating loop (minor symmetrical loop closely approaching the major loop) will be described from point N to P in the first period and from P back to N in the second period. The contribution of the selected core to a final integrated signal will, on the other hand, be considerable if it was originally in state P. The core in state P originally describes a very slight magnetic excursion during the first period of excitation, and then in the second period of excitation it will change violently from P to N. Therefore, the total integrated signal at the of the second period will be zero or very small, when the selected core was originally at N, and very large when the selected core was originally at P. This occurs whatever the state of magnetization of the other cores on the selected lines and however imperfect the checkerboard cancellation may be.

To better appreciate the significance of the above, attention is called to Figs. 3A and 3B, which show the voltage received from a single core when it is driven in the fashion previously indicated. Fig. 3A shows the waveshape of the output voltage received from a core which is initially in state N. The solid curve is the voltage induced in the reading coil when the core is driven from N to P and then from P to N again. The dotted curve represents the integrated voltage which is obtained as a result of integrating the voltage induced in the reading coil from this single core. It will be seen that the integrated voltage at the end of the second period is essentially zero. Fig. 3B similarly represents the waveshape of the voltage induced in the reading coil from a single core which is driven over the two periods when the core is initially at P. As shown, there is substantially no change upon the excitation with a P going force, but a substantial voltage is obtained when the core is driven from P to N. The integrated voltage has a substantial amplitude and is readily detected.

Figs. 4A and 4B show the waveshapes of the voltages induced in the reading coil from the selected and nonselected cores when they are driven in the manner described. Fig. 4A shows the waveforms of the voltages induced in the reading coil when the selected core is initially at N. In receiving the drive from N to P the non-selected cores, plus the selected core provide substantial outputs. One curve 50 shows the contribution from the non-selected cores, the other curve 52 shows the total signal output. In being driven from P to N, the total signal output is substantial but has the opposite polarity, and accordingly, the total integrated signal at the end of this cycle is essentially zero. Referring to Figure 4B, when the selected core is initially at P, during the application of a P drive in the first period, the contribution from the unselected cores, curve 50, is substantial, and there is substantially no contribution from the selected core. Therefore, the total signal curve 52 will differ very little. The contribution from the unselected cores during the drive from P' to N is the same as previously, but this time there is a substantial contribution from the selected core. The dotted integrated signal curve over the cycle indicates that a useful signal will be provided at the end of the cycle having a significant amplitude.

To evaluate what has just been said, it may be pointed out that (1) by the cycling of the cores in the fashion described and (2) by integrating the output voltage that results, a substantial cancellation of unwanted signals occurs, leaving a readily discernible wanted signal. If the cores are still selected to be as uniform as possible and the reading winding is wound in the matrix for signal cancellation, as described above, this system permits an extension of the size of a magnetic matrix to substantially any desired limit. This unwanted signal cancellation is obtained without any additional apparatus. It is obtained by using the apparatus already developed for the magnetic matrix. The sole sacrifice is in the time required for the additional operations. Since the operating time of magnetic matrices is now within the microsecond region, this does not amount to too great a sacrifice.

After the end of the second period, the memory core will be in state N, regardless of its initial state. If it is desired to maintain it in state N, no further operations are necessary. If, on the other hand, a signal was detected, the core was originally at state P and it is necessary to restore it to P in order that the information not be lost. This restoration to P may be accomplished by a three-step schedule added to the first two steps, making a total schedule of five steps.

*TABLE I*

| Periods | 1 | 2 | 3 | 4 | 5 |
|---|---|---|---|---|---|
| *x* Switch | P | N | P | N | ------ |
| *y* Switch | P | N | P | ------ | N |

Table I above shows the steps to be used in reading the magnetic matrix. The third step of the five schedule cycle is to excite the selected row and colume coils simultaneously to P as was done in the first step. This leaves the selected core at P. Then the two selected lines or the row and column coil are excited successively in the fourth and fifth periods. This excitation schedule prevents cumulative demagnetization of the unselected cores, which may occur if the hysteresis loops are not closed upon themselves by the cycling excitation.

At the end of the second period the value of the integrated voltage determines the future scheduling. Since some time is necessary for any electronic circuit to react to that value and to determine the remaining schedule, it appears that some dead time may be necessary between steps 2 and 3. This may be avoided by initiating step 3 immediately after step 2. At the conclusion of step 3 the electronic gates or circuitry responding to the integrated signal have had a chance to operate and can then be used to determine steps 4 and 5. Step 4, in this instance, can either be where both column coil and row coil coupled to the selected memory core are simultaneously excited to drive the core to the condition N, or else they are excited separately to condition N in steps 4 and 5. In this modified schedule, every row coil and every column coil receives excitation to P and N twice for every interrogation of a memory core. These steps are set forth in Table II.

*TABLE II*

| Periods | 1 | 2 | 3 | 4 | 5 |
|---|---|---|---|---|---|
| *x* Switch | P | N | P | N | ------ |
| *y* Switch | P | N | P | N | N |

For writing, if it is desired to have uniform read and write schedules, the five step schedule can also be used and the desired writing signal can then simply be substituted for the integrated reading signal at the end of step 2.

A memory system which can be operated according to the schedule of Table II is illustrated in Fig. 5. The magnetic memory matrix 60 is represented by a rectangle. The row coil driving magnetic switch 62, also known as the *x* switching matrix driving the "*x*" side of the magnetic memory, is of the type previously shown in Figure 1 and described and claimed in application Serial No. 337,902 noted above. The magnetic switching matrix, which drives the column coils also designated as the "*y*" switch 64, is also of the same construction. The *x* switch row and column coils (not shown) are respectively driven by driver tubes represented by rectangles **66*x*, 66*y***. Similarly, the *y* switch row and column coils (not shown) are driven by driver tubes respectively represented by rectangles 68x, 68y. The driver tubes which are selected to be driven are primed by address signals and are rendered conductive by signals from the pulse source which here consists of structure to be described. The memory system should be recognized as a schematic of the system shown and described in Figure 1.

Determining the saturation condition of a core in the memory matrix is performed here by means of controlling the length of the pulses applied to the *y* switch while the *x* switch has a standard pulse length. As previously described, the simultaneous termination of the pulses applied to the *x* and *y* switches leaves the core, which is selected in the magnetic memory, in condition N, while sequential termination of the excitation applied to the *x* and *y* switches leaves the selected core in the magnetic memory in condition P. One system for performing these operations using different pulse durations is found described and claimed in application Serial No. 346,162 noted above.

The operation of the system shown in Fig. 5 follows. Figure 6 should be considered with Figure 5 as it shows the waveshapes which are obtained when the system is operated. The periods or intervals shown in Figure 6 correspond to those shown in Table II. Whenever it is desired to either read or write, a pulse is applied from an "initiate pulse" source 70 to a first and second univibrator 72, 74. The initiate pulse source may be any controllable pulse source. These univibrators 72, 74, as well as a third and fourth univibrator, 76, 78, or one shot multivibrators, may be of the type described and shown as flip-flops on page 50 et seq. in a first edition of Time Bases, by O. S. Puckle, published by John Wiley and Sons, Inc. These univibrators have a stable or standby condition and an unstable or active condition. The duration of the unstable condition may be determined by the time constants selected for the particular univibrator. The first univibrator is triggered into its unstable condition by the "initiate pulse" for the duration of the first period; the second univibrator is triggered into its unstable condition for the duration of the first and second periods. These periods or intervals are those referred to in the tables.

The output of the first univibrator 72 during its unstable period is applied (1) directly to the drivers **66*x*, 66*y*** or driving tubes which drive the row and column coils in the *x* switching matrix, 62, and (2) through a pulse combiner 80 to the drivers **68*x*, 68*y*** or driving tubes which drive the row and column coils in the *y* switching matrix 64. It should be noted that the address of the memory switch core desired to be operated upon, as established by the addresses of the cores in the *x* switch and *y* switch coupled thereto, are set up by priming the driver tubes prior to initiating a reading or writing operation cycle. The application of a pulse from the first univibrator 72 to the respective *x* and *y* switch drivers causes the addressed core in each switch to turn over and thereby apply a P going drive to the selected memory core. If it is desired to write N, then, as shown in Table II, in the second period the pulse applied from the first univibrator is allowed to subside and the cores in the switching matrix which were driven to P are returned to N together, thus bringing the selected core in the memory matrix back to N.

At the end of the second period, the second univibrator in returning to its stable condition, applies its output through a differentiating network and rectifier to trigger the third and fourth univibrators 76, 78. The third univibrator has its time constants selected so that it remains in its unstable state during the third period and the fourth univibrator has its time constants selected so that it remains in its unstable state during the third and fourth periods. These are shown graphically in Figure 6. The output pulse from the third univibrator 76 is applied to the *x* and *y* switching matrix drivers during the third period in the same manner as was the first univibrator output pulse, thus driving the selected switching cores and the selected magnetic matrix core coupled to them to P again. In the fourth period this third univibrator pulse is allowed to subside, thus again returning both selected switch cores simultaneously to N, which brings the selected memory core back to N.

To write P, the memory system goes through the same operations in the first two periods as are gone through in the first two periods for writing N. In the third period, the third univibrator supplies a pulse to the *x* and *y* switch drivers as before. The output of the fourth univibrator, which extends over the third and fourth periods, is applied to an "and gate 1," 82 and to an "and gate 2," 84. These "and gates" comprise circuitry, well known in the art, which have two or more inputs and a single output so designed that an output signal is produced only upon a coincident presentation of input signals. Suitable circuits are shown and described on page 37 of High Speed Computing Devices, by Engineering Research Associates, and published by the McGraw Hill Book Company. Thus, neither "and gate 1" or "2" provides an output in response to the application of the output from the fourth univibrator alone. However, during the third period, a "write P" pulse is applied to "and gate 2" from a "write P" pulse source 85. The "write P" pulse lasts through the fourth period. This permits "and gate 2" to pass a pulse to the "or" gate 86. An "or gate" is a gate having multiple inputs and one output. It provides an output in response to a pulse applied to any one of its multiple inputs. Suitable circuits may also be found in the cited High Speed Computing Devices reference. Accordingly, the "or" gate 86 applies a pulse to "and gate 1," thus permitting it to pass a pulse to the pulse combiner 80.

As previously indicated, in the third period the pulse from the third univibrator is used to drive the selected switch cores and thereby the selected memory core to P for the second time. However, in the fourth period, when the pulse from the third univibrator has subsided, only the selected switch core in the *x* switch returns to N. The selected switch core in the *y* switch is maintained at P by virtue of the pulse from the fourth univibrator 78 being applied through the now opened "and gate 1," 82 and through the pulse combiner 80 to the drivers **68*x*, 68*y*** of the *y* switch 64. In the fifth period the fourth univibrator output is terminated and the *y* switch core returns to N. The selected core in the memory remains at P in view of the sequential restoration of the switch cores to N.

In the process of reading, the following operations obtain. An initiating pulse is applied to the first and second univibrators as before, the first univibrator supplies a pulse for the first period to drive the selected core in the *x* and *y* switching matrices and the selected memory core coupled thereto to P. The second univibrator supplies an output pulse during periods 1 and 2 to an "and gate 4" 90. A pulse is also supplied from a "read pulse" source 88, which is only actuated when it is desired to read and which has a duration over the first four periods. Accordingly, "and gate 4" 90 is open and applies a pulse to one input of "and gate 5" 92 during the first two periods.

The memory core in the first period receives a P drive which drives it to P, if it is not already there. During the second period when the output pulse from the first univibrator subsides, the memory core is restored to N as before. During the first and second periods voltages are induced in the reading coil 61 of the memory. These are applied to the reading amplifier 94, amplified, and then are applied through the "and gate 5" 92, which is held open for the first two periods, to an integrator 96. The integrator is the well known "Miller integrator," which has appended thereto a clamp 98. The clamp functions in the absence of an input pulse, to clamp the integrator to a voltage level from which it can integrate positively or negatively when a pulse is applied which inactivates the clamp for the pulse duration. The integrator, clamp and the following upper and lower discriminators 100, 102 are described in more detail below. The reason that both a "positive" and "negative" integration is required is due to the fact that the magnetic memory reading coil is coupled to different cores with reversed polarity, as was explained previously, and therefore the polarity of the voltages induced in the reading coil can change with a change in the core in the memory being read.

The pulse which inactivates the clamp 98, so that the integrator can function, is provided by the read pulse source 88. Therefore, the integrator can function for the first four periods. However, its input is terminated at the end of the second period when "and gate 5" closes and it accordingly maintains its output for the third and fourth periods. The integrator output is applied to an upper and lower discriminator 100, 102. These pass a signal only if their input is above or below a certain level. The output from the upper and lower discriminator is the true reading signal.

If an output is present it indicates that the core being read was initially in P and accordingly must be restored to P. To accomplish this the reading signal, or the output from the discriminators, is applied to "and gate 3" 104, which also has applied to its input a pulse from the fourth univibrator 78. Accordingly, during the third and fourth periods any reading signal output is applied through "and gate 3" through the "or gate" 86 to "and gate 1" 82. Since the other input to "and gate 1" is also the output of the fourth univibrator, "and gate 1" is opened and its output is applied during the third and fourth periods to hold the core in the *y* switch at P. During the fifth period the *y* switch core is allowed to return to N. The memory core thus remains at P in view of the sequential restoration of the switch cores. It should be appreciated that if a core being read is originally at N, there is no output from the discriminators, "and gate 3" and "1" remain closed, and the memory core is returned to N during the fourth period.

Figure 7 is a circuit diagram of a "pulse combiner." It will be seen that this is simply an "or" gate which consists of two triodes 110A, B having their anodes 112A, 112B connected together to B+. The grids 114A, 114B are respectively coupled to the first and third univibrators, and to "and gate 1." Their cathodes 116A, B are connected together and to a common load resistor 118. A negative bias is applied to the cathode and a greater negative bias to the grids, so that in standby condition both tubes are not conducting and the output from the cathode is negative. A positive signal applied to either grid will cause the tube to conduct and the cathode goes positive. Accordingly, when a signal is received from "and gate 1," at the termination of the signal from univibrator 3, the cathode output is still maintained positive during the fourth period.

Figure 8 is a circuit diagram of a clamp, integrator and discriminator which may be used. This circuit is shown and described in an application by Raymond Stuart-Williams, Serial No. 344,735, filed March 26, 1953, noted above.

The output of the single ended video amplifier is applied to the grid of a Miller integrator tube 120 of the type which has its feedback condenser 122 returned to the grid through a cathode follower tube 124. The plate of the Miller integrator is set at an operating point by means of a clamping arrangement so that the integrator can integrate in either a positive or a negative direction. As previously indicated, the signals from the magnetic matrix which are detected by the reading winding may be of either polarity. By making the Miller integrator able to integrate in either direction, these signals may be readily handled directly.

The clamp consists of four diodes 130, 132, 134 and 136, which are connected between the anodes of the two tubes 138, 140 of the clamp control amplifier. These diodes and amplifier serve to reset the operating point of the Miller integrator after each reading. Two of the clamping diodes 130, 134 have their anodes connected together and returned to the plate of the first tube 138 in the clamp amplifier through a resistor 142. The other two diodes 132, 136 in the clamp have their cathodes connected together and then returned to the plate of the second tube 140 in the clamp control amplifier through a resistor 144. The two sets of clamp diodes also are connected in series, one cathode-anode connection 146 being returned to the plate of the Miller integrator tube, the other cathode-anode connection 148 being returned to a source of clamping potential which is the potential point at which it is desired that the anode of the integrator tube be clamped. The first tube 138 of the clamp amplifier has a negative bias applied to its grid. The second tube 140 of the clamp amplifier is returned to ground through a grid leak resistor 150 and through a condenser 152 is coupled to the reading pulse source 88. The first and second tubes 138, 140 are coupled through a common cathode resistor 154 to a negative potential source.

Under standby conditions, the first tube 138 of the clamp amplifier maintains the anodes of the diodes 130, 134, to which it is coupled, at a potential more positive than the clamping potential, and the second clamp amplifier tube maintains the cathodes of the clamp diodes 132, 136 at a potential which is more negative than the clamping potential. The second clamp tube in this condition is conducting, while the first is not. The clamp diodes are therefore conducting and the potential at which it is desired that the integrator tube plate be maintained is set, since, on the assumption of an insignificant diode resistance, the cathodes of the lower two clamp diodes are essentially at the clamping potential point, as is also the junction 146 between the cathode and anode of the two clamp diodes which are connected to the integrator tube anode. When it is desired to read from the magnetic matrix, the reading pulse source 88 is energized as previously described. The polarity of the pulse required is negative and this causes an exchange in the conduction and non-conduction of the first and second tubes from the standby condition. A phase inverter stage (not shown) may be used to obtain the required pulse polarity. This exchange in conduction serves to block the clamp diodes so that the plate of the Miller integrator is free to move positive or negative.

The output from the video amplifier 92 is applied to the grid of the Miller integrator. The signal is integrated and the integrated result is applied to the upper and lower discriminators 100, 102. Signals which exceed a certain positive value and signals which are more negative than a certain lower positive value are the desired signals and will provide an output from the discriminators. Other signals in between these two levels will be rejected and no discriminator output is obtained.

The lower discriminator 100 includes two triodes 156, 158 and the upper discriminator 160, 162 includes two triodes. Each of the two triodes are provided with a common cathode bias resistor 164, 166. One of the tubes 158, 160 in each pair have their anodes returned to B+ through a common anode load resistor 168. The other tube anodes are returned to B+ directly. The one of the tubes 158 in the first set, which has the common plate load 168, has its grid returned to a potential which defines the lower limit below which it is desired that signals be accepted. The other tube 156 in the lower discriminator pair has its grid connected to the cathode of the cathode follower. The tube 162 of the upper discriminator which does not have the anode load, has its grid returned to a source of bias potential, which marks the upper limit above which it is desired to accept signals. Its companion tube 160 also has its grid connected to the cathode follower. As an illustration, the bias to which the discriminator tube grids are returned in one instance is +50 and in the second instance is +190. The tubes 156 and 162 which are not connected to the common anode load are conducting, thus holding the other tubes 158, 160 cut off. Accordingly, an output is received from the common anode load only if the Miller integrator output exceeds 190 volts or is less than 50 volts. These levels may be altered to achieve suitable discrimination between desired large area signals and undesired small area signals.

The operation of the comparator is as follows:

If the integrator output is less than 50 volts, a transfer of conduction between the two tubes 156, 158 in the lower discriminator pair occurs. The first tube in the first comparator is normally conducting, since it is connected to the cathode of the cathode follower tube which is maintained by the integrator anode potential at a higher positive potential than 50 volts (substantially 120 vols in the quiescent condition). When the signal from the cathode follower is below 50 volts, then the reversal in the conduction of the two tubes occurs with a consequent negative output obtained from across the common anode load resistor. In the upper discriminator pair the tube 162 to which the fixed high bias is applied, is normally conducting and the tube 160 coupled to the cathode follower is accordingly normally cut off. When the signal from the cathode follower 120 exceeds 190 volts, these two tubes exchange conduction and a negative output pulse is provided across the common anode load resistor 168 indicative of this fact.

After the fourth interval has expired, the negative pulse applied to the clamp amplifier is removed, thus permitting the clamp to become operative again and restore the plate of the Miller integrator in its starting operating potential. The embodiment of the invention thus far shown and described employs a scheduling whereby "pulse lengthening" is employed to obtain a sequential restoration of the switch cores to N and thus write P in the memory. It should be appreciated that a "pulse shortening" schedule may also be employed to achieve the same end. Regarding Table III below, during the first three intervals the scheduling is the same as shown previously.

*TABLE III*

| Period | 1 | 2 | 3 | 4 | 5 |
|---|---|---|---|---|---|
| $x$ Switch | P | N | P | P | N |
| $y$ Switch | P | N | P | P | N |

However, the pulses that are applied to both the $x$ and $y$ switch may be made to last over periods 3 and 4. Thus in the fifth interval the subsiding $x$ and $y$ switch pulses, in returning to N together, return the memory core to N. If it is desired to write P, then it is necessary to shorten either the $x$ or $y$ switch pulse in the fourth period. Thus, if, in the fourth period the $y$ switch is restored to N, the $x$ switch will be restored to N in the fifth period. This sequential restoration of the switches insures that the selected core in the memory remains at P.

Figure 9 shows a schematic diagram which permits the type of operation described. Since essentially the same apparatus is used as is shown in Figure 5, with a few changes, only the changes are shown. The first, second, third and fourth univibrators 72, 74, 76, 78 are the same as before except that the third univibrator 76 is driven by the initiating pulse this time instead of by the output from the second univibrator. Furthermore, the third univibrator is driven into its unstable condition for the first three periods. Its output is applied to "and gate 1" 82 as an inhibiting signal. Accordingly, "and gate 1" will not pass any signal whatsoever during the first three intervals. The output of univibrator 4 and the "or gate" is applied to "and gate 1" as previously. In place of the pulse combiner an inhibit gate 170 is used. This has the output of the "and gate 1" applied as an inhibiting input, and the outputs from the first and fourth univibrators 72 and 78 applied thereto. The inhibit gate 170 will provide an output in response to an input from either univibrator except in the presence of an inhibit input from "and gate 1." The outputs from the first and fourth univibrators are also applied to the $x$ switch drivers. The output from the inhibit gate goes to the $y$ switch drivers.

When it is desired to write N in a selected core, the initiating pulse source is energized to drive the first, second and third univibrators. The first univibrator drives the $x$ and $y$ switch cores to P (and the memory core) in the first interval. It terminates its output and the switch cores and memory core are restored to N in the second interval. During the third and fourth intervals the third univibrator holds the switch cores (and the memory core) at P. In the fifth interval the $x$ and $y$ switch cores simultaneously return to N bringing the memory core to N with them. To write P, the initiating pulse source is energized as well as the write P pulse source. During intervals 3 and 4 an output from "and gate 2" is applied through the "or gate" to "and gate 1" as described previously in Figure 5. However, due to the inhibiting effect of the signal from the third univibrator, "and gate 1" will not provide any output until after the first three intervals have elapsed. The output from "and gate 1" then inhibits the inhibit gate 170. This terminates the gating pulse being applied to the $y$ switch drivers. Thus, in the fourth period the $y$ switch core is restored to N. The $x$ switch core is restored to N in the fifth period. In view of the sequential return of the switch cores to N, the selected memory core is left in P.

The process of reading is accomplished as previously described for Figure 5. If no output is obtained after the signal detected in the reading coil is integrated and discriminated, the apparatus shown in Figure 9 operates as described above for writing N. If an output is obtained after the integration and discrimination of the reading coil signal, then this output is applied to "and gate 1" through the "or gate" and the apparatus shown in Figure 9 functions in the manner above described for writing P.

Figure 10 is a circuit diagram of an "and gate" with an inhibit input and an inhibit gate which are suitable for use in the embodiment of the invention shown in Figure 9. Other suitable "gates" are shown and described in an article "Typical Block Diagrams for a Transistor Digital Computer," by J. H. Felker, in the December, 1952, issue of the magazine Electrical Engineering. Referring to Figure 10, three tubes 180, 182, 184 have a common anode load 186. The grid of the first tube 180 receives a signal from the "or gate." It is also biased so that the tube is non-conducting in the absence of a signal. The second tube 182 has signals from the fourth univibrator applied to its grid. This tube is also biased so that in the absence of a signal it is non-conducting. The third tube 184 is biased so that it will conduct in the absence of a signal. In the presence of a signal applied to its grid from univibrator 3 the tube is cut off.

The inhibit gate includes a multicontrol grid tube 188 wherein a first control grid 196 is coupled to the first and fourth univibrators to receive signals therefrom. The tube is biased to be non-conductive in the absence of these signals. Its screen grid 194 is coupled to the B+ supply through a voltage dropping resistor. The tube has its suppressor grid 192 connected to a point on a voltage divider 200 connected between the common anode connection of the " and gate" and B—. The voltage from the divider is selected so that the inhibit gate tube can conduct responsive to a signal applied to its grid except when there is an output from the "and gate" (all "and gate" inputs except the inhibit input are excited). At this time the inhibit gate tube will not conduct regardless of what signals are applied to its grid. The tube 202 following the inhibit gate is merely a phase inverter stage.

Figure 11 is an illustration of a schematic diagram of another and preferred embodiment of the invention which can be used for writing and reading over a five pulse interval. Similar functioning apparatus in Figure 11 bears the same reference numerals as are shown in Figure 5. This embodiment employs a "read-write" register 204 and a P-N register 206. Both of these registers are bistable state multivibrators of the well known Eccles Jordan type, and these are found fully described on page 164 et seq. of Wave Forms, by Chance et al., published by McGraw-Hill Book Company. As is known, these bistable multivibrators contain two tubes having their anodes and grids cross-coupled. The tubes are biased so that they will remain in a condition with one tube conducting and the other cut off until the application of either a positive pulse to the cut-off tube or a negative pulse to the conducting tube causes a conduction transfer between the tubes. Thus, if it is desired to write N in the memory the "read-write" register is actuated from a "write" pulse source 208. The P-N register is set, by application of a pulse from a "write N" pulse source 210, with the N tube side high and the P tube side low.

A clock pulse from a clock pulse source 212 is applied to the first univibrator 214 through an "or" gate 213 to trip it to its unstable state. The clock pulse is also applied to an "and gate" 215. The first univibrator remains unstable for one interval. Its output is applied after amplification (not shown) to gate on the *x* and *y* switch drivers 66*x*, 66*y*, 68*x*, 68*y* which have been previously primed by address signals as explained heretofore. The output of the first univibrator is differentiated by a differentiator 216 and the trailing edge of the output pulse applied to "and gate" 215. The clock pulse duration is made just long enough to insure operation of "and gate" 215 upon receipt of the output from the first univibrator. The "and gate" output is used to trigger on the second univibrator 218. The second univibrator stays on for the second interval. Its output is differentiated by a differentiating network 220 and the trailing edge of the output pulse is used to trigger on the first and third univibrators 214, 222. The first univibrator output again drives the *x* and *y* switches 62, 64 to P. The third univibrator output is applied to an "and gate" 224 which, however, remains closed since its other input is derived from the P-N register which was initially set in N and therefore does not provide an output to permit this "and gate" 224 to open. Accordingly, at the termination of the second output from the first univibrator, the selected *x* and *y* switch cores have been driven from the starting N to P to N to P to N again and thus the memory core is left in N. Since the clock pulse has terminated before the second operation of the first univibrator terminates, the "and gate" 215 remains closed and the second univibrator remains inoperative.

If it is desired to write P, the "read-write" register 204 is set in write as before, the P-N register 206 is set in P by receiving a pulse from a write P source 211. The first, second and third univibrators function as was described previously. However, this time the "and gate" 224 is primed by the output from the P-N register. Therefore, when the trailing edge of the output of the third univibrator occurs it passes through the "and gate" 224 and drives the fourth univibrator 225 into its unstable condition. The output of the fourth univibrator is applied to the *y* switch drivers to inhibit them. It should be noted that the duration of the unstable state of the third univibrator is made approximately half that of first univibrator. Therefore, when the fourth univibrator is driven, its output serves to permit restoration to N of the selected *y* switch core while the first univibrator is in its unstable state for the second time and prior to the restoration to N of the selected switch core. This leaves the selected core in the memory in P. The manner of inhibiting the *y* switch drivers may readily be seen by referring to Figure 1. It merely requires the application of a sufficiently negative pulse to the second control grids of the driver tubes of the *y* switch.

For reading, the following operations occur:

The read-write register is set in "read" 204 from a read pulse source 203. The "P-N" register 206 is set in N. The clock pulse is applied to start the univibrators operating. The first, second and third univibrators function as previously indicated. The clock pulse is also applied to the integrator clamp 98 to inactivate it over the intervals of operation of the first and second univibrators. The integrator 96 thus integrates the output from the reading coil 61 over the first cycle of operation by the first univibrator and the second univibrator. This integrated output is amplified by an amplifier 226 applied to a D. C. restorer 228 which, in well known fashion, restores its level with respect to ground and then to the upper and lower discriminators 100, 102. The output of the discriminators is applied to an "and gate" 230 which is also coupled to receive output from the "read" side of the "read-write" register 204 and a pulse from the trailing edge of the output from the second univibrator. If the memory core being read was originally in N, no output is obtained from the discriminator, this "and gate" remains closed and the memory core will be left in N. If the memory core was originally in P, there will be an output from the discriminator, the "and gate" 230 will open at the time of receiving a pulse from univibrator 2. The "and gate" 230 output is applied to the "P-N" register 206 and drives it to the condition where its P output is high. This primes the "and gate" 224 between the third and fourth univibrators, so that the fourth univibrator can be driven by the third univibrator and thus inhibit the *y* switch drivers. Thus there is a sequential restoration of cores to N in the *x* and *y* switches. This leaves the selected memory core in P, the condition it had at the commencement of the reading operation. The P-N register is used to store the information supplied by the integrator and discriminators. In view of this fact the clock pulse must hold the integrator clamp inoperative only until the information has been transferred into the P-N register at the end of the output from the second univibrator. The clamp can then be allowed to function again.

Although the embodiments of the invention described herein have been for "two-dimensional" memories, the invention is equally applicable to "three-dimensional" memory operation where a parallel operation of the two dimensional memories is provided for word storage instead of single bit storage. This may be provided by having a separate system for each matrix. Alternatively an arrangement similar to the one described in application Serial No. 346,162, previously identified, may be used. Referring to Fig. 12, in this system one *x* switch 230 is used to provide the selection of a desired column coil in each of a plurality of memory matrices $MM_1$, $MM_2$, $MM_3$. Each memory matrix, however, has its own *y* switch $y_1$, $y_2$, $y_3$ for row coil selection in each corresponding memory.

The single *x* switch has its own drivers, 230*x*, 230*y*, each *y* switch has its own associated drivers, 232$y_1$, $y_2$, $y_3$ and 234$y_1$, $y_2$, $y_3$. Of course, the *x* and *y* switches represented by the rectangles are similar to the type identified in Figure 1. One each of the first, second and third univibrators are required in the same arrangement as was described for Figure 11 (represented by a rectangle 236). One "and gate" 224 followed by a fourth univibrator 225 is required for each magnetic matrix. The third univibrator feeds one input of all the "and gates" 224. Each matrix also requires its own reading circuit. This "reading circuit" representative rectangle 238 includes an integrator 96, amplifier 226, D. C. restore 228, discriminator 100, 102, and "and gate" 230 as shown in Figure 11. One "read-write" register is required for the entire systems. A P-N register 206 is provided for each matrix.

Thus, the first three univibrators cycle the respective three memory cores which are selected by the $x$, and $y_1$, $y_2$, $y_3$ switches in the same manner as was explained for the one matrix in Figure 11. Whether or not a memory core returns to N or remains in P is determined by whether or not the "and gate" 224 is opened and the fourth univibrator for that particular memory is tripped. This in turn is determined, where the operation is a writing one, by whether the P-N register is set in P or N. In the reading operation, each of the memory matrices will, or will not, present an output to the reading circuit which will, or will not drive the P-N register to the state where it opens the "and gate" depending on whether the memory core was initially P or N. Thus the output from each matrix, when it is being read, determines whether or not the fourth univibrator is tripped and accordingly returns the associated $y$ switch to N before the $x$ switch core is so returned.

There has been shown and described above novel and useful methods and apparatus for reading from and writing into a magnetic memory matrix system which permits the construction of large scale memories while providing an excellent wanted to unwanted reading signal ratio. Although the embodiments of the invention herein have been described employing arrangements which have the magnetic cores in an array of rows and columns, this is not to be construed as a limitation, since many other arrangements are possible which may still be considered as falling within the spirit of the invention.

What is claimed is:

1. In a magnetic matrix memory of the type including (1) a plurality of magnetic cores, each core representing a bit of information by the polarity of its state of magnetic saturation, (2) means to apply magnetomotive forces to each of the cores in said memory, and (3) a reading coil coupled to all the cores of said memory, and wherein, in applying magnetomotive forces to drive a selected core from magnetic saturation at one polarity to magnetic saturation at the opposite polarity or vice versa, mganetomotive forces of lesser values are applied to other cores in said memory, the method of increasing the ratio of wanted to unwanted reading signals comprising the steps of applying to a core selected to be read magnetomotive forces in a direction to drive said core to magnetic saturation at one polarity, applying magnetomotive forces to said core to drive it to magnetic saturation at the opposite polarity, integrating the signals induced in said reading coil responsive to the application of said magnetomotive forces in both directions, and applying to said core magnetomotive forces of such magnitude as to drive it to magnetic saturation at said one polarity when said integrated signals at the end of said intervals exceed a predetermined magnitude.

2. In a static magnetic matrix memory of the type including (1) a plurality of magnetic cores, each core representing a bit of information by the polarity of its state of magnetic satuation, (2) means to apply magnetomotive forces to each of the cores in said memory, and (3) a reading coil coupled to all the cores of said memory, and wherein, in applying magnetomotive forces to drive a selected core from magnetic saturation at one polarity to magnetic saturation at the opposite polarity or vice versa, magnetomotive forces of lesser values are applied to other cores in said memory, the method of increasing the ratio of wanted to unwanted reading signals comprising the steps of applying magnetomotive forces to a core selected to be read in a direction to drive it to magnetic saturation at one magnetic polarity, applying magnetomotive forces to said core to drive it to magnetic saturation at the opposite polarity, applying magnetomotive forces to said core to drive it to magnetic saturation at said one polarity, integrating the signals induced in said reading coil responsive to the first two applications of magnetomotive forces to said selected core, and applying magnetomotive forces to said selected core of a magnitude to drive it to magnetic saturation at said opposite polarity responsive to said integrated signals having less than a predetermined value.

3. In a static magnetic matrix memory of the type including (1) a plurality of magnetic cores, each core representing a bit of information by the polarity of its state of magnetic saturation, said cores being arrayed in columns and rows, (2) a different row coil inductively coupled to all the cores in each row, (3) a different column coil inductively coupled to all the cores in each column, (4) means to selectively excite said row and column coils, and wherein each core requires a simultaneous current excitation of a row and column coil coupled thereto to be driven from magnetic saturation at one polarity to magnetic saturation at the opposite polarity and vice versa, (5) and a reading coil inductively coupled to all said cores, the method of increasing the ratio of wanted to unwanted reading signals comprising the steps of applying current excitation simultaneously to the row and column coil coupled to a core selected to be read to drive it to magnetic saturation at one polarity, applying current excitation simultaneously to the row and column coil coupled to said selected core to drive it to magnetic saturation at the opposite magnetic polarity, integrating the signals induced in said reading coil responsive to both said applications of current excitations, and applying current excitation simultaneously to said row and column coil coupled to said selected core to drive it to magnetic saturation at said one polarity only when said integrated signals exceed a predetermined value.

4. In a static magnetic matrix memory of the type including (1) a plurality of magnetic cores, each core representing a bit of information by the polarity of its state of magnetic saturation, said cores being arrayed in columns and rows, (2) a different row coil inductively coupled to all the cores in a row, (3) a different column coil inductively coupled to all the cores in a column, (4) means to selectively excite said row coils and column coils, each core requiring a simultaneous current excitation of a row and column coil coupled thereto to be driven from magnetic saturation at one polarity to magnetic saturation at the opposite polarity and vice versa, (5) and a reading coil inductively coupled to all said cores, the method of increasing the ratio of wanted to unwanted reading signals comprising the steps of applying current excitation in a first interval simultaneously to the row and column coil coupled to a core selected to be read to drive it to magnetic saturation at one polarity, applying current excitation in a second interval simultaneously to the row and column coil coupled to said selected core to drive it to magnetic saturation at the opposite magnetic polarity, integrating the signals induced in said reading coil responsive to the current applications in both said intervals, applying current excitation simultaneously to said row and column coil coupled to said selected core to drive it to a magnetic saturation at said one polarity, and applying current excitation simultaneously to said row and column coil coupled to said selected core to drive it to magnetic saturation at said opposite polarity only when said integrated signals at the end of said intervals are less than a predetermined level.

5. A method of operating a static magnetic matrix memory system of the type including (1) a plurality of magnetic memory cores arrayed in columns and rows, each core representing a bit of information by the polarity of its state of magnetic saturation, (2) a reading coil coupled to all of said cores, (3) a first and a second magnetic switch each consisting of a plurality of magnetic switch cores magnetically saturated at one polarity, each core in said first switch being inductively coupled to a different column of cores in said memory, each core in said second switch being inductively coupled to a different row of cores in said memory, and (4) means to selectively drive the cores in each switch, wherein a simultaneous drive of a core in each of said switches toward saturation at the opposite polarity is required to drive a memory core coupled to both said switch cores toward saturation in one polarity, and simultaneous restoration of said switch cores to said one polarity is required to drive a memory core to saturation in the opposite polarity, said method of operation comprising the steps of simultaneously driving a switch core in each of said switches coupled to a memory core desired to be read towards saturation at the opposite polarity, simultaneously restoring said switch cores to magnetic saturation in said one polarity, integrating the signals induced in said reading coil responsive to driving and restoring of said switch cores, driving said switch cores towards saturation at said opposite polarity only when said integrated signals exceed a predetermined level, and sequentially restoring said two switch cores to magnetic saturation at said one polarity.

6. A method of operating a static magnetic matrix memory system of the type including (1) a plurality of magnetic memory cores arrayed in columns and rows, each core representing a bit of information by the polarity of its state of magnetic saturation, (2) a reading coil coupled to all of said cores, (3) a first and a second magnetic switch each consisting of a plurality of magnetic switch cores magnetically saturated at one polarity, each core in said first switch being inductively coupled to a different column of cores in said memory, each core in said second switch being inductively coupled to a different row of cores in said memory, a simultaneous drive of a core in each of said switches toward saturation at the opposite polarity being required to drive a memory core coupled to both said switch cores toward saturation in one polarity, and simultaneous restoration of said switch cores to said one polarity being required to drive a memory core to saturation in the opposite polarity, said method comprising the steps of simultaneously driving a switch core in each of said switches coupled to a memory core desired to be read towards saturation at the opposite polarity, simultaneously restoring said switch cores to magnetic saturation in said one polarity, integrating the signals induced in said reading coil responsive to the driving and restoring said switch cores to provide a resultant integrated signal, driving said switch cores towards saturation at said opposite polarity, simultaneously restoring said two switch cores to magnetic saturation at said one polarity when said resultant integrated signal is less than a predetermined level, and sequentially restoring said two switch cores to magnetic saturation at said one polarity when said resultant integrated signal exceeds said predetermined level.

7. A method of operating a static magnetic matrix memory system of the type including (1) a plurality of magnetic memory cores arrayed in columns and rows, each core representing a bit of information by the polarity of its state of magnetic saturation, (2) a reading coil coupled to all of said cores, (3) a first and (4) a second magnetic switch, each consisting of a plurality of magnetic switch cores, each core in said first switch being inductively coupled to a different column of memory cores, each core in said second switch being inductively coupled to a different row of memory cores, (5) means to maintain the cores in both said switches, in the absence of driving forces, magnetically saturated at one polarity, a simultaneous drive of a core in each of said switches towards saturation in the opposite polarity being required to drive a memory core coupled to both said switch cores to magnetic saturation at said one polarity, a simultaneous restoration of said switch cores to said one polarity being required to drive a memory core to saturation at the opposite polarity, said method of operating said memory comprising the steps of simultaneously driving and holding a switch core in each of said switches coupled to a memory core desired to be read towards saturation at said opposite polarity, simultaneously terminating the hold applied to said switch cores to permit their simultaneous return to said one polarity, integrating the signals induced in said reading coil responsive to the driving and termination of the hold of said switch cores, simultaneously driving and holding said switch cores towards said opposite polarity only when said integrated signals at the end of said intervals exceed a predetermined value, and sequentially terminating the hold applied to said switch cores to permit their sequential return to said one polarity.

8. A method of operating a static magnetic matrix memory system of the type including (1) a plurality of magnetic memory cores arrayed in columns and rows, each core representing a bit of information by the polarity of its state of magnetic saturation, (2) a reading coil coupled to all of said cores, (3) a first and (4) a second magnetic switch, each consisting of a plurality of magnetic switch cores, each core in said first switch being inductively coupled to a different column of memory cores, each core in said second switch being inductively coupled to a different row of memory cores, (5) means to maintain the cores in both said switches in the absence of driving forces magnetically saturated at one polarity, a simultaneous drive of a core in each of said switches towards saturation in the opposite polarity being required to drive a memory core coupled to both said switch cores to magnetic saturation at said one polarity, a simultaneous restoration of said switch cores to said one polarity being required to drive a memory core to saturation at the opposite polarity, said method of magnetic memory matrix operation comprising the steps of simultaneous driving and holding a switch core in each of said switches coupled to a memory core desired to be read towards saturation at said opposite polarity, simultaneously terminating the hold applied to said switch cores to permit their simultaneous return to said one polarity, integrating the signals induced in said reading coil responsive to said driving and termination of said hold of said switch cores, simultaneously driving and holding said switch cores towards said opposite polarity, simultaneously terminating the hold applied to said switch cores to permit their simultaneous return when said integrated signals are less than a predetermined level, and sequentially terminating the hold applied to said switch cores to permit their sequential return to said one polarity when said integrated signals exceed said predetermined level.

9. A method of operating a static magnetic matrix memory system of the type including (1) a plurality of magnetic memory cores arrayed in columns and rows, each core representing a bit of information by the polarity of its state of magnetic saturation, (2) a reading coil coupled to all of said cores, (3) a first and (4) a second magnetic switch, each consisting of a plurality of magnetic switch cores, each core in said first switch being inductively coupled to a different column of memory cores, each core in said second switch being inductively coupled to a different row of memory cores, (5) means to maintain the cores in both said switches, in the absence of driving forces, magnetically saturated at one polarity, a simultaneous drive of a core in each of said switches towards saturation in the opposite polarity being required to drive a memory core coupled to both said switch cores to magnetic saturation at said one polarity, a simultaneous restoration of said switch cores to said one polarity being required to drive a memory core to saturation at the opposite polarity, each said switch having its switch cores arrayed in columns and rows, each said switch including a plurality of row coils each of which is inductively coupled to a different row of cores and a plurality of column coils each of which is inductively coupled to a different column of cores, a switch core being driven and held towards magnetization at said opposite polarity by the simultaneous application of exciting currents to the row and column coils coupled thereto, said method of operating said static magnetic matrix comprising the steps of simultaneously applying exciting currents to a selected row coil and a selected column coil in each of said switches coupled to a switch core in each switch which in turn is coupled to a memory core desired to be read, simultaneously terminating the application of said exciting currents, integrating the signals induced in said reading coil responsive to said application and termination of application, of said exciting currents, simultaneously applying exciting currents to said selected row and column coils, and sequentially terminating said exciting currents when said integrated signals are less than a predetermined value.

10. A method of operating a static magnetic matrix memory system of the type including (1) a plurality of magnetic memory cores arrayed in columns and rows, each core representing a bit of information by the polarity of its state of magnetic saturation, (2) a reading coil coupled to all of said cores, (3) a first and (4) a second magnetic switch, each consisting of a plurality of magnetic switch cores, each core in said first switch being inductively coupled to a different column of memory cores, each core in said second switch being inductively coupled to a different row of memory cores, (5) means to maintain the cores in both said switches, in the absence of driving forces, magnetically saturated at one polarity, a simultaneous drive of a core in each of said switches towards saturation in the opposite polarity being required to drive a memory core coupled to both said switch cores to magnetic saturation at said one polarity, a simultaneous restoration of said switch cores to said one polarity being required to drive a memory core to saturation at the opposite polarity, each said switch having its switch cores arrayed in columns and rows, each said switch including (1) a plurality of row coils each of which is inductively coupled to a different row of cores, and (2) a plurality of column coils each of which is inductively coupled to a different column of cores, a switch core being driven and held towards magnetization at said opposite polarity by the simultaneous application to the row and column coils coupled thereto of exciting currents, said method of operation of said magnetic matrix comprising the steps of simultaneously applying exciting currents to a selected row coil and a selected column coil in each of said switches coupled to a switch core in each switch which is coupled to a memory core desired to be read, simultaneously terminating the application of said exciting currents, integrating the signals induced in said reading coil responsive to said excitation and termination of the application of said exciting currents, simultaneously applying exciting currents to said selected row and column coils simultaneously terminating said exciting currents when said integrated signals are less than a predetermined level, and sequentially terminating said exciting currents when said integrated signals at the end of said intervals exceed said predetermined level.

11. A magnetic memory system comprising a plurality of saturable magnetic cores, coil means to apply to a selected core only a magnetomotive force of core saturating strength, means to cause said core saturating magnetomotive force to be applied successively in one sense and then in the opposite sense, thus to complete a cycle, a winding coupled to all said cores, and an integrating circuit coupled to receive the output of said last-named winding and to integrate over the said complete cycle.

12. A magnetic memory system comprising a plurality of saturable magnetic cores, coil means to apply to one selected core only a magnetomotive force of core saturating strength in one sense, means to apply to said one selected core only a magnetomotive force of core saturating strength of the other sense, means to apply said force of one sense and of the other sense in consecutive sequence, thus to complete a cycle, a coil means coupled to all said cores, and an integrating means coupled to receive the output of said coil means and to ingrate over at least the said complete cycle.

13. A magnetic memory system comprising a plurality of saturable magnetic cores, means to apply to one selected core only a magnetomotive force of core saturating strength, means to cause said force to be applied successively in one sense and then in the opposite sense, a coil means coupled to all said cores, an integrating means to receive the output of said coil means and to integrate over at least the successive applications of said forces, and a means coupled to and responsive to said integrating means to control subsequent application of saturating magnetomotive force to said selected core.

14. A magnetic memory system comprising a plurality of saturable magnetic cores, means to apply to one selected core only a magnetomotive force of core saturating strength, means to cause said force to be applied successively in one sense and then in the opposite sense, thus to complete a single cycle, and then again in said one sense, a coil means coupled to all said cores, an integrating means coupled to receive the output of said coil means, and means responsive to the integration by said integrating means during said single cycle of magnetomotive force application to leave said selected core without the application of further saturating magnetomotive force or to cause said force to be applied in said other sense.

References Cited in the file of this patent

Publication I, RCA Review, vol. 13, Issue 2, June 1952, pp. 187–192.
Publication II, Radio News, December 1951, pp. 3–5.